(12) United States Patent
Rouse

(10) Patent No.: US 9,554,571 B2
(45) Date of Patent: Jan. 31, 2017

(54) ELK REEL

(71) Applicant: Andrew J. Rouse, Avon, CO (US)

(72) Inventor: Andrew J. Rouse, Avon, CO (US)

( * ) Notice: Subject to any disclaimer, the term of this patent is extended or adjusted under 35 U.S.C. 154(b) by 0 days.

(21) Appl. No.: 14/699,211

(22) Filed: Apr. 29, 2015

(65) Prior Publication Data

US 2016/0316741 A1 Nov. 3, 2016

(51) Int. Cl.
*A01M 31/00* (2006.01)

(52) U.S. Cl.
CPC .................................. *A01M 31/004* (2013.01)

(58) Field of Classification Search
CPC .............................. A01M 31/00; A01M 31/004
See application file for complete search history.

(56) References Cited

U.S. PATENT DOCUMENTS

| | | | | |
|---|---|---|---|---|
| 209,274 A * | 10/1878 | LaMontagne | ....... | A01M 31/004 446/208 |
| 2,439,736 A * | 4/1948 | Horne | ...................... | G10K 9/02 446/416 |
| 2,584,549 A * | 2/1952 | Carhart | .................. | A63H 33/40 446/202 |
| 2,711,614 A * | 6/1955 | Halsten | ......................... | 446/208 |
| 3,815,283 A | 6/1974 | Piper | | |
| 4,030,241 A * | 6/1977 | Gallagher | ........... | A01M 31/004 446/202 |
| 4,637,154 A * | 1/1987 | Laubach | ............... | A01M 31/06 43/1 |
| 4,761,149 A * | 8/1988 | Laubach | ............. | A01M 31/004 446/205 |
| 5,830,036 A | 11/1998 | Richardson | | |
| 5,885,126 A | 3/1999 | Carlson | | |
| 6,045,429 A * | 4/2000 | Marino | ............... | A01M 31/004 446/207 |
| 6,083,075 A | 7/2000 | Meeks | | |
| 6,168,493 B1 | 1/2001 | Kirby | | |
| 6,231,418 B1 * | 5/2001 | Hancock | ............. | A01M 31/004 446/207 |
| 6,234,859 B1 | 5/2001 | Primos et al. | | |
| 6,308,876 B1 | 10/2001 | Havens | | |
| 6,357,159 B1 | 3/2002 | Bowling | | |
| 6,575,804 B1 | 6/2003 | Primos | | |
| 6,709,309 B1 * | 3/2004 | Bishop | ................ | A01M 31/004 446/188 |
| 7,011,563 B2 | 3/2006 | Ady | | |
| 7,462,091 B1 | 12/2008 | Bean | | |
| 7,553,210 B1 * | 6/2009 | Keller, Jr. | ........... | A01M 31/004 446/202 |
| 7,785,166 B1 | 8/2010 | Kirby | | |
| 8,016,638 B1 | 9/2011 | Kirby | | |
| 8,142,253 B2 | 3/2012 | Peel | | |
| 8,727,828 B2 | 5/2014 | Pribbanow | | |
| 2009/0258566 A1 | 10/2009 | May | | |
| 2011/0287689 A1 | 11/2011 | Griffin | | |

* cited by examiner

*Primary Examiner* — Gene Kim
*Assistant Examiner* — Alyssa Hylinski
(74) *Attorney, Agent, or Firm* — Browdy and Neimark, PLLC

(57) ABSTRACT

A device for producing a sound like the vocalization of an elk, the device having two pivotably connected portions, wherein said sound is produced by blowing into an opening, the air being directed over a bent vibratable reed, the pitch being adjustable by pivoting the portions to be more or less parallel to each other.

12 Claims, 4 Drawing Sheets

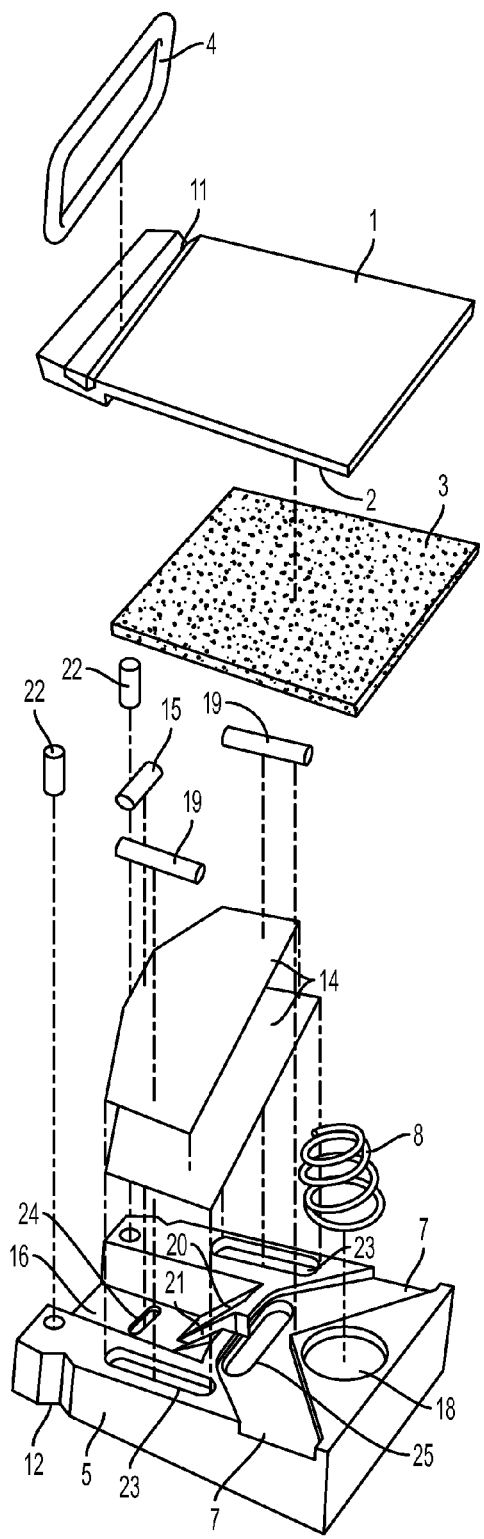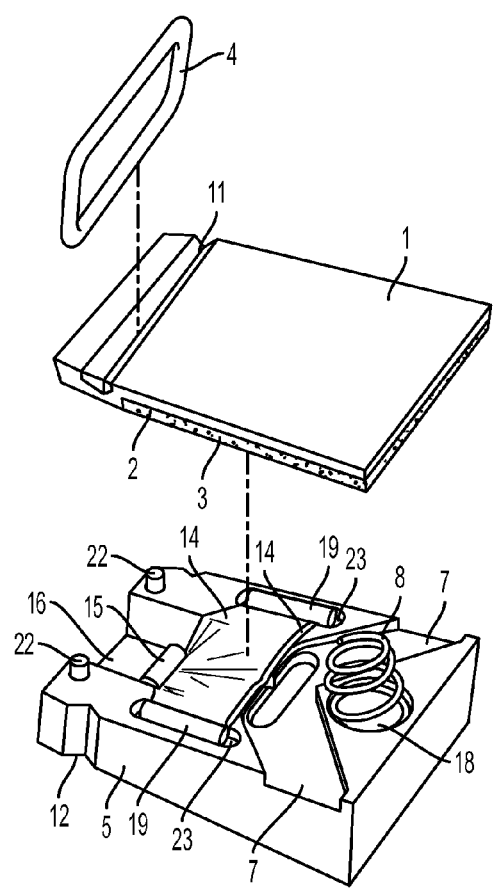
FIG. 7
FIG. 8

ELK REEL

BACKGROUND OF THE INVENTION

Field of the Invention

This invention is directed to a device (a "call" or "reel") for attracting attention of an elk.

Description of the Background Art

The elk (*Cervus canadensis*) is one of the largest species of the Cervidae (deer family) in the world, and one of the largest land mammals in North America and eastern Asia.

Elk make vocalizations for a variety of purposes, including to warn other elk of danger, to express distress if injured or trapped, to maintain contact with other members of the herd, and, in the case of bull elk, to express dominance (warning away rival bulls and attracting cows).

An elk call may be used to attract an elk for purposes of hunting, wildlife observation or wildlife photography. Elk hunting has grown in popularity over the past 20 years by leaps and bounds. Elk have become increasingly more pressured and have responded by changing their behavior and adapting to being more nocturnal and educated to the ways of hunters. They don't respond to calls as readily and tend to hide out in the deepest darkest corners of elk country which makes them very hard to locate.

Bean, U.S. Pat. No. 7,462,091 describes an apparatus with a bellows coupled to a reed for calling game. The apparatus also features a reed controller, operable by contact with the bellows, to change the pitch of the sound. However, there is no rocker action to alter the pitch as in the present invention. The design of the present invention uses no bellows and the reed (or reeds) are completely different in composition of materials, shape and orientation.

Ady (Laubach), U.S. Pat. No. 7,011,563 describes a "two-sided" game call featuring a plurality of cylindrical/tubular reeds and contoured surfaces beneath the reeds. The mouthpiece extends beyond the main body of the device. The reeds of the present invention are bent, starting at approximately a 45 degree slope and then changing to a horizontal slope. There is no mouthpiece that extends beyond the device.

Primos, U.S. Pat. No. 6,575,804 discloses a game calling apparatus with a mouthpiece protruding beyond the main body of the device. The sound is manipulated by moving a pressure point structure along the reed to alter its reed contact point. Primos, U.S. Pat. No. 6,234,829 describes a moisture diverter system to direct moisture away from the reed. The call of the present invention has no mouth piece. There is no pressure point structure. It has a diaphragm instead of a forward facing reed. A lid rocks closed pinching the airflow over a 45 degree angled ramp with a final plane that is horizontal from an upslope that catches more air and allows a sound to be created from the most delicate of airflow to a loud blast with full volume of air let through with the lid less tensioned.

Kirby, U.S. Pat. No. 6,168,493 teaches a box-type game (especially turkey) call wherein a sound is generated by the impact of a paddle against an edge. Other box-type calls are described by Peel, U.S. Pat. No. 8,142,253; Richardson U.S. Pat. No. 5,830,036. The call of the present invention has no paddle. It uses a diaphragm encased in a two parted box with a lid attached with a pin and band hinge at one end and open with a spring at the other to allow it to be played like an instrument. Air is blown through up and over a bent diaphragm that is slightly slack.

Meeks, U.S. Pat. No. 6,083,075 describes an animal call with a protruding mouthpiece in which the sound is made by a vibrating reed and the sound is amplified by spaced-apart flexible diaphragms interconnected by a tension coil spring. The diaphragm in the call of the present invention needs no spacing.

Bishop, U.S. Pat. No. 6,709,309 discloses a game call with a diaphragm and a sliding plunger-type pump assembly for creating an airflow over the diaphragm. The call of the present invention does not use a plunger and its diaphragm is not planar. Rather, it is bent. Air flow causes it to vibrate against a foam-lined lid after the reed bends up to a horizontal plane from the initial approximately 45 degree slope. The rockering motion of the lid allows infinite playability and control of sound as well that is not duplicatable with any other diaphragm call. Due to the precise pressure that can be easily manipulated due to the spring loaded lid and delicate pressure sensitivity of the foam Kirby U.S. Pat. No. 8,016,638 teaches a mouth-operated game call comprising a diaphragm. The housing includes foam, but it is designed to provide improving sealing against the roof of the mouth and reduce tongue discomfort, rather than to alter the acoustical character of the call. The call of the present invention doesn't seal against the roof of the mouth. In fact it encases the diaphragm in a spring-loaded rocker with a foam lining. This reduces the skill needed to operate a mouth diaphragm.

Pribbanow, U.S. Pat. No. 8,727,828 discloses a wild game call featuring pipes of variable length attached to a splitter.

Carlson, U.S. Pat. No. 5,885,126 describes a waterfowl or game call making use of a set of interchangeable chokes to alter the volume.

Piper, U.S. Pat. No. 3,816,283 describes a diaphragm-type game caller with a moisture-absorbent pad.

Griffin, US 2011/0287689 discloses a device for generating a stream of air; the device can be used as the source of an airflow by a connected "grunt" (call).

Kirby, U.S. Pat. No. 7,785,166 describes a game call making use of pressurized air from a bellows.

SUMMARY OF THE INVENTION

The objects of the invention include the following:
to provide an elk call that permit the user to imitate the vocalizations of male and female elk.
to provide an elk call that can make the same sound (i.e. the same sequence of pitches and duration of each pitch) at low or high volume.
to provide an elk call that simulates the effect of the spongy tissue in the voice box of the elk by means of vibration of the reed against a foam
to provide an elk call that modulates pitch by a rocker action that modifies the angle that a foam surface makes with the reed
to provide an elk call in which the reed is disposed in a bent shape disposed so that the air flow is up and over the reed, and in which the reed is not taut, so as to better simulate the elk vocalization
to provide an elk call in which the slackness of the reed is readily adjustable.

Other objects and advantages of the invention will be evident from the remainder of this specification.

In a preferred embodiment, the elk call comprises:
a top portion having an inside facing surface lined with a closed cell foam;
a bottom portion having a slot (throat chamber) in an inside facing surface extending partially into the bottom portion from a first edge, the slot ramping up to the inside surface at an end opposite the first edge; and a v-shaped groove in the inside facing surface, the v-shaped groove opening out toward a second edge of the bottom portion opposite the first edge;

where the top and bottom portions are pivotally affixed near the first edge and a spring is disposed between the top and bottom portions near the second edge.

At least one reed is disposed across a part of the inside facing surface of the bottom portion; the reed is oriented with a long edge parallel to the first edge and disposed over the ramped edge of the slot. The reed is adjustably attached on both short edges to adjust the amount of slack in the reed for tuning purposes.

BRIEF DESCRIPTION OF THE DRAWINGS

FIGS. 7 and 8 show exploded perspective views of a second embodiment in which two reeds are provided.

DETAILED DESCRIPTION OF THE PREFERRED EMBODIMENTS OF THE INVENTION

Figure 1:
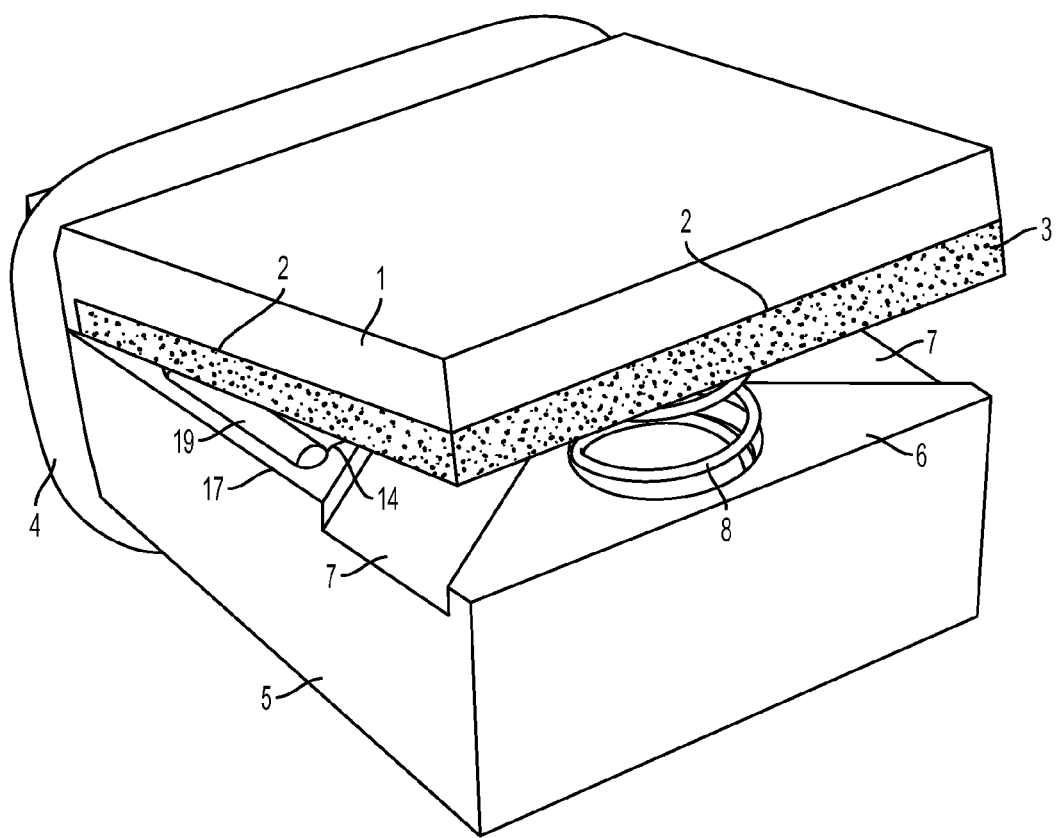
FIG. 1 shows a perspective view of the caller.

FIG. 1 shows a perspective view of an embodiment of the caller, the caller being in the open position. The figure depicts the top portion 1 with inside facing surface 2 (only the edges of which are visible in this figure), which features a recess in which the closed cell foam lining 3 sits. This is pivotably connected by pivoting means 4 to the bottom portion 5, which has inside facing surface 6. A V-shaped groove 7 is disposed in this surface. The free ends of the top and bottom portions may be brought together by pressure, thus bringing the caller toward or into the closed position, but this is resisted by spring 8 disposed between the top and bottom portions. One of the lateral reed securing pins 19 and a sliver of the reed 14 are also visible.

Figure 2:
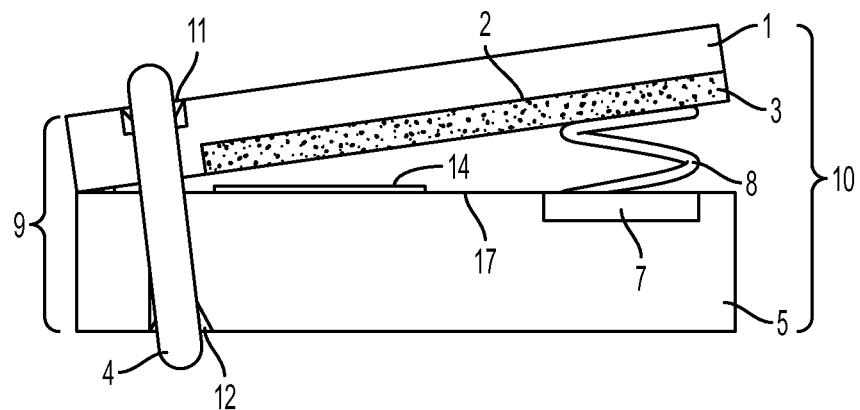
FIG. 2 shows a profile view of the caller.

FIG. 2 shows a profile view of the same embodiment. The caller is again in the open position. In this view, one may see more clearly the front (mouthpiece end) 9 and the rear (spring end) 10 of the two portions. It is also apparent that in this embodiment, the pivoting means 4 takes the form of an elastic band sitting in top portion notch 11 and bottom portion notches 12.

Figure 3:
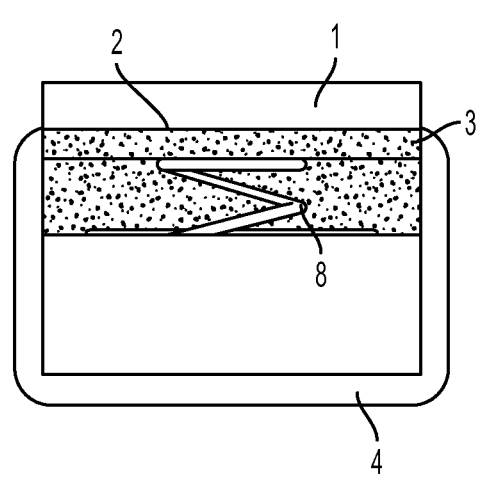
FIG. 3 shows a rear (distal end) view of the caller.

FIG. 3 shows a rear (distal end) view of the distal end 10 of the caller, in the closed position. Note that the spring 8 compresses the lining 3 at its points of contact.

Figure 4:
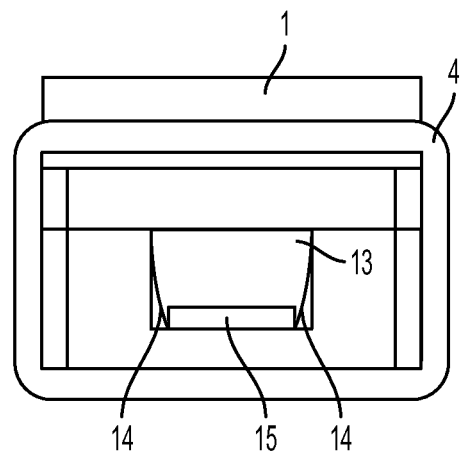
FIG. 4 shows a front (mouthpiece end) view of the caller.

FIG. 4 shows a front (mouthpiece end) view of the caller, in the closed position. At this end one can see the throat 13, which is the chamber containing the reed 14 (only the edge of the reed is visible, and it is partially hidden behind frontal reed securing pin 15. The user will blow through the throat, toward and over the reed.

Figures 5, 6:
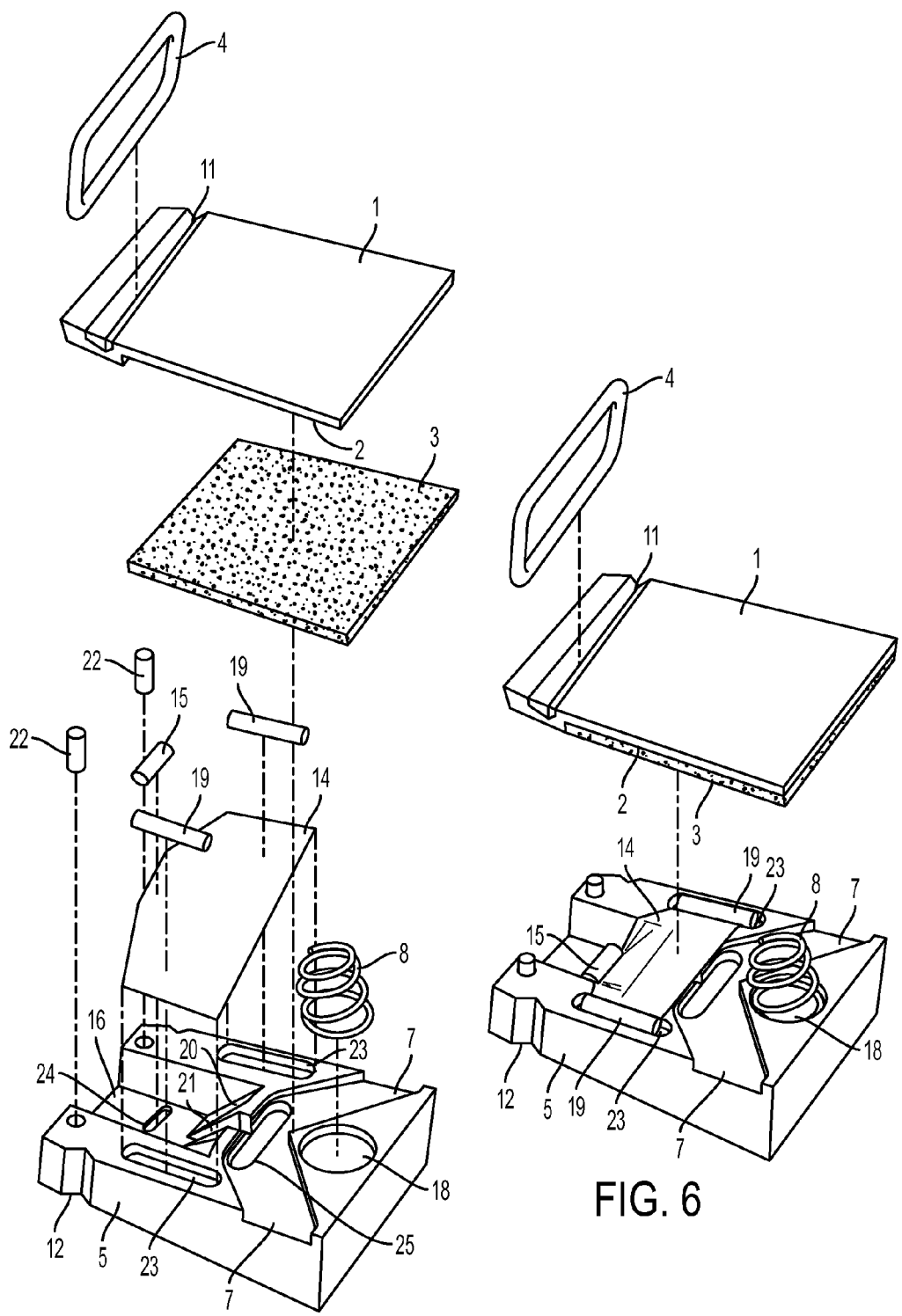
FIGS. 5 and 6 show exploded perspective views of a first embodiment in which a single reed is provided.

FIG. 5 shows an exploded perspective view of the caller. The spring 8 sits in recess 18 in the inward-facing surface 17 of bottom portion 7. In this view, one can see that the reed 14 is retained in position across the top of the throat (chamber) 13 by the frontal reed securing pin 15 and the lateral reed securing pins 19. The former fits into pin slot 24 and the latter fit into pin slots 23. The floor of the throat is depicted as 16. A ramp 20 rises from the floor in the direction of the reed 14, i.e., toward the rear (moving end) of the caller. A channel 21 is disposed in the center of the ramp, running from front to rear thereof. Pins 22 help secure the top portion to the bottom portion at the mouthpiece end.

FIG. 6 is a partially exploded view with the reed secured and the spring 8 seated in recess 18.

FIGS. 7 and 8 are analogous to FIGS. 5 and 6, but they depict a double reed, rather than the single reed of FIGS. 5-6.

Overall dimensions. The device should be large enough to generate an adequate volume of sound, and small enough for convenient handling. The device can be made in different sizes, with a maximum dimension of from about one to about six inches, however, for ease in carrying multiple calls, e.g., on a string worn around the neck, 1.5 inches in length is preferred. Preferably, the device in the closed position has a length (from mouthpiece end to opening end) of about 1.5 inches and a width of about 1.25 inches.

The preferred individual part dimensions set forth below are in particular for a device of the preferred overall dimensions. If a larger device is used, the individual part dimensions may be kept substantially the same, increased proportionally, or somewhere in-between. The aspect ratio (overall length: overall width) is preferably kept the same but may be altered. Preferably the overall length is not more than twice the overall width. The change in some individual part dimensions may influence the sound but a compensatory change may be made in other individual part dimensions if desired.

Top portion. The top portion may be made of any rigid material that can be given the appropriate shape, including metal, rubber, plastic (e.g., acrylic) or wood, and preferably is made of wood. It preferably has a thickness of about 0.25 inches. The foam lining 3 may be any foam that is suitably compressible; the purpose of the foam lining 3 is to simulate the acoustic effect of the spongy tissue in the voice box of the elk. It should be able to return to its original shape even after frequent compressions. A closed cell foam is preferred because with open cell, there could be some airflow through the foam that might adversely alter the sound. Any compressible closed cell foam, rubber or plastic, may be used. Such materials include polyurethane, polyethylene and polystyrene plastics, as well as neoprene and natural latex foam rubbers. However, polyethylene is particularly preferred. Polyethylene, cross-linked polyethylene and neoprene have been found to be similar in performance, but polyethylene is the cheapest.

The thickness of the lining 3 should be enough to provide the desired acoustic effect but not so thick as to make it difficult to work the call. A thickness of even an inch is still manageable. An uncompressed thickness in the range of about $1/16^{th}$ to $1/8^{th}$ inch is preferred, and one of about $1/8^{th}$ inch is especially preferred. The dimensions of the recess in the inward-facing surface 2 of the upper portion 1 should be sufficient to accommodate the lining. The thickness of the lining may be a little greater than the thickness of the recess, in which case the compression of the foam lining when the caller is closed will provide an additional elastic resistance.

Bottom portion. The top portion may be made of metal, rubber, plastic or wood, and preferably is wood. It preferably has a thickness of about $7/16$ths of an inch.

At the mouthpiece end, the bottom portion features a throat 13, essentially the chamber that the user blows into. The throat is preferably formed by a modified (see below) slot in the inward-facing surface of the bottom portion, whose longest dimension is in the front-to-rear direction, i.e., from mouthpiece end to distal end.

The throat 13 has an open ceiling and is roughly rectangular in plan and frontal view, but its floor 16, while horizontal at the mouthpiece end, slopes upward (ramp 20)

toward the reed 14. Preferably the width of the ramp is the same as the width of the throat.

Preferably, the throat has a width of about 0.5 inches at the floor of the throat at the mouthpiece end. A wider throat deepens the pitch and a narrower one increases it. The side walls of the throat may be vertical or may slope outward slightly. Preferably, the height of the throat at the mouthpiece end is about 0.25 inches.

The ramp preferably begins about 0.375 inches from the mouthpiece end, and rises at an angle of 30-60 degrees, preferably about 45 degrees. Thus, it may have a run of about 0.25 inch and a rise of about 0.25 inch. Note that the rise is about equal to the height of the throat. A shallower ramp gives a higher pitch. If the ramp is too steep, the device will not function properly.

The ramp 20 contains a central slot 21 running toward the reed 14. This central slot helps to start the vibration of the reed. It is preferably V-shaped in cross-section, and the floor of the V is sloped up toward the reed, but at a shallower angle than the ramp 20. The length of the slot is the same as the run of the ramp, and its width at the top is preferably about $5/16^{th}$ of an inch. The depth of the slot is preferably about $3/32$ of an inch at the top of the ramp, and about equal to the height of the throat at the bottom of the ramp.

The central slot 21 extends beyond the ramp and throat, cutting across the bottom portion. This portion of the central slot 21 is preferably about 0.125 inches in length.

Reed. The caller may be equipped with one or two reeds. The reed is approximately rectangular or trapezoidal in shape and thus has two short edges and two long edges. The reed is a flexible piece of material capable of vibrating to create sound. It may be made of any suitable vibratable material, but nitrile rubber is preferred. Natural rubber may also be used, with the caveat that some people are allergic to it. Preferably, the reed is about 0.001 inches thick.

The front of the reed rests on the floor 16 of the throat 13, and the reed runs front-to-back over the ramp 20 and its slot 21. The reed is thus bent; being sloped over the ramp and essentially horizontal distal to the ramp (with possibly an indentation where it lies over the slot 21). Consequently, when the device is in the closed position, the foam is essentially flat against the reed.

When air is blown into the throat from the mouthpiece end, it flows over the reed, which vibrates at a high rate, at least in some device positions against the foam. For the proper sound, it is important that the reed be slightly loose, not stretched. A double reed increases the number of vibrations, and makes for a call that sounds like it might be made by multiple elk.

The reed is secured by any suitable means, such as adhesive tape, glue, pins, or combinations thereof. These means are preferably removable so that the amount of slack in the reed can be adjusted, or the reed replaced, if need be. In a preferred embodiment, these take the form of two lateral securing means and one frontal securing means. More preferably, these securing means are slot-and-pin mechanisms; the reed material covers the slot and the pin is forced over the reed to pinch the reed material between the pin and the wall of the slot.

Preferably the portion of the reed that is exposed when the top portion is removed, i.e., is not under the securing means and is thus free to vibrate, is about 0.5 inches in length and 1.875 inches in width.

The rear of the throat communicates through the central slot 21 with the V-shaped groove disposed in the inward-facing surface of the bottom portion. At the foot of the central slot 21 is optionally the lateral slot 25, which is essentially perpendicular to the central slot 21 and lies in the floor of the V-shaped groove 7 (and thus is deeper than 7). The lateral slot 21a, if provided, is preferably about 0.5 inches long (in the lateral direction, i.e., perpendicular to the line from the mouthpiece end to the distal end) and 0.125 inches wide, and the floor of the lateral slot is roughly at the same height as the floor of the central slot 21 at the end nearest the distal end of the device, i.e., where it meets the V-shaped groove 7.

The V-shaped (in plan) groove 7 provides two channels by which the sound exits the caller, and these channels are believed to create an echoing effect that enhances the realism of the call. The V-shaped groove also acts to protect the foam 3. The grooves preferably open out to the sides of the device, close to the distal end.

The groove 7 is preferably about $1/16^{th}$ inch deep, and preferably about $5/16^{th}$ inch wide (measured perpendicularly to the wall of the groove). The angle of the V is preferably about 90 to about 110 degrees.

The V-shape groove 7 is preferably truncated on the wall closer to the mouthpiece end, and there communicates through central slot 21 with the throat 13.

The length of the device from the mouthpiece end or the throat to the top of the ramp is preferably about $5/8^{th}$ inch. The length of the device from the mouthpiece end of the throat to the far end of the central slot 21 is preferably about $7/8^{th}$ inch. That is also approximately where the V-shape groove is truncated.

At the mouthpiece end, there is a pivotable connection between the upper and lower portions. This may take any conventional form, but it is desirable that it readily disassemblable so that the reed slackness may be adjusted. Thus, in the preferred embodiment, it is a combination of (1) a rubber band engaging notches on the outside of the top and bottom portions, near but not at the mouthpiece end, and (2) pins fixed in the lower portion and facing upward, and engaging holes in the inward-facing surface of the upper portion, said holes and pins being closer to the mouthpiece end than said rubber band and notches.

The spring 8 may be of any material typically used to form springs, and is preferably metal. It is preferably of the coil type and may be cylindrical or conical in profile. The choice of spring dimensions is not critical as the spring merely serves to provide some resistance to closing the device, thus making it easier to control the pitch by controlling the angle of the top portion to the bottom portion. By way of example and not limitation, the spring could have a maximum outer diameter of about 0.3 inch, and a free (uncompressed) length of about 0.4 inches, and be formed of a steel wire with a diameter of 0.03 inches.

Preferably, the spring is chosen such that in the open (relaxed) position, the angle of the top portion to the bottom portion is about 10 degrees.

Pressure may be applied at the distal end of the device to the upper and/or lower portion in order to reduce the angle that the upper portion makes with the lower portion. This reduces the distance between the reed and the foam, most pronouncedly at the opening end. The pressure may be applied by hand, or by putting the device in one's mouth and biting down on it. The advantage of the device being small enough to fit in the mouth and be modulated by biting it that it leaves both of the user's hands free.

As the pressure is increasingly applied, closing the gap between the upper and lower portions at the distal end, the pitch produced as air is blown into the throat at the mouthpiece end is increased.

The identification of top and bottom is arbitrary. The call will function equally well upside down, or turned sidewise.

The well-known sounds made by a cow or bull elk, or by elk calves, are referred to herein as natural elk calls. While each elk may have a unique call, they have common characteristics which are well known to hunters and designers of elk calls. Moreover, recordings of elk vocalizations are readily available to the public.

The tuning in the field of the present invention and the optimization of the parameters of this call during design and manufacture are often done by careful listening to the sound produced by an individual familiar with these natural elk calls. While it is possible to use sophisticated electronic sound measuring equipment, it is believed that the present invention may be readily manufactured without such equipment, if an individual who is familiar with such natural elk calls assists in the process.

It will be appreciated by the skilled worker in the art that the dimensions and materials of the device may be varied, so long as it does not substantially impair the functionality of the device.

Unless otherwise expressly taught, the term "about" as used to qualify a numeric value generally connotes that a 20% variation is acceptable, i.e., the term "about X" would encompass 80% X to 120% X. The usage "about X" will further connote that in a preferred embodiment, the value will be in the range of 90% to 110% X.

The invention claimed is:

1. A device for producing a sound similar to an elk vocalization, said device having a mouthpiece end and a distal end, said device comprising a top portion comprising an inward-facing surface having a compressible foam lining, a bottom portion comprising an inward facing surface, a throat chamber formed in said bottom portion, said throat chamber having a top, a floor and a mouthpiece end, said throat chamber being open at said mouthpiece end thereof and at the top of said throat chamber, and comprising a ramp portion which rises from the floor of said throat chamber, means for releasably securing a vibratable reed with a desired tautness so that it covers at least a portion of said ramp portion and at least a portion of the inward-facing surface of said bottom portion, whereby the reed is in a bent configuration, and means for pivotably connecting said top portion and said bottom portion so that said device can assume a closed position in which the inward facing surfaces of said top and bottom portions are substantially parallel and an open position in which said surfaces are not substantially parallel, wherein said device, when said reed is secured therein, produces a sound when air is blown into it at the mouthpiece end of said throat chamber and the pitch of said sound is dependent on the tautness of said reed, the slope of said ramp, and the angle made by the inward facing surfaces of the top and bottom portions.

2. The device of claim 1 which further comprises said vibratable reed.

3. The device of claim 1 wherein said ramp portion comprises a central slot that runs parallel to the ramp.

4. The device of claim 3 wherein said central slot has a V-shaped cross section.

5. The device of claim 3, wherein the bottom portion further comprises two channels, beginning at or near the distal end of the device, that meet in a V-shape near the distal end of said central slot and communicate therewith.

6. The device of claim 5, wherein said securing means are slot-and-pin means.

7. The device of claim 5, wherein said means for pivotably connecting the two portions comprises a rubber ring or band engaging slots on said top and bottom portions.

8. The device of claim 7, said means for pivotably connecting the two portions further comprising pins for preventing the sliding of the top portion relative to the bottom portion or vice versa.

9. The device of claim 3, wherein the ramp has a slope of about 45 degrees.

10. The device of claim 1, wherein the foam lining is composed of a closed cell foam.

11. The device of claim 1, wherein the sound produced is dependent on the degree of compression of the foam lining as a result of the angle made by the inward facing surfaces of the top and bottom portions.

12. The device of claim 1, wherein the top and bottom portions are pivotably connected such that the pivot axis is at the mouthpiece end.

* * * * *